United States Patent [19]

Richards

[11] 4,310,342

[45] Jan. 12, 1982

[54] METHOD AND APPARATUS FOR PREHEATING PULVEROUS MATERIALS AT REDUCED PRESSURE PRIOR TO THEIR INTRODUCTION INTO A MELTING FURNACE

[75] Inventor: Raymond S. Richards, Sylvania, Ohio

[73] Assignee: Owens-Illinois, Inc., Toledo, Ohio

[21] Appl. No.: 215,479

[22] Filed: Dec. 11, 1980

Related U.S. Application Data

[63] Continuation-in-part of Ser. No. 190,158, Sep. 24, 1980, abandoned.

[51] Int. Cl.³ .............................................. C03B 3/00
[52] U.S. Cl. ........................................ 65/27; 65/134; 65/335; 165/3; 165/111; 165/112
[58] Field of Search ............... 65/335, 27, 134; 165/3, 165/104 M, 111, 112

[56] References Cited

U.S. PATENT DOCUMENTS

| | | | |
|---|---|---|---|
| 2,911,198 | 11/1959 | Karlsson | 165/111 X |
| 3,274,752 | 9/1966 | Huyghe et al. | 165/104 M |
| 3,880,639 | 4/1975 | Bodner et al. | 65/134 |
| 4,184,861 | 1/1980 | Erickson et al. | 65/27 |
| 4,248,616 | 2/1981 | Seng et al. | 65/335 |

*Primary Examiner*—Arthur D. Kellogg
*Attorney, Agent, or Firm*—E. J. Holler; M. E. Click; D. H. Wilson

[57] ABSTRACT

The present invention relates to method and apparatus for preheating pulverous materials, such as glass batch constituents, prior to their introduction into a melting furnace to increase the efficiency and output of the melting installation. The pulverous materials are passed downwardly through a shell and tube preheater with sub-atmospheric pressure over the pulverous material to remove the contained moisture in vapor form from an upper region of the preheater. The decreased atmospheric pressure prevents moisture condensation and build-up on the pulverous material within the tubes, especially in cooler areas, which can cause tube pluggage. The subject invention is of particular utility to the glass industry, and especially glass melting furnaces, but is also applicable to other types of shell and tube heat-exchange applications.

26 Claims, 2 Drawing Figures

METHOD AND APPARATUS FOR PREHEATING PULVEROUS MATERIALS AT REDUCED PRESSURE PRIOR TO THEIR INTRODUCTION INTO A MELTING FURNACE

CROSS-REFERENCE TO RELATED APPLICATION

This application is a continuation-in-part application of pending U.S. patent application Ser. No. 190,158 filed Sept. 24, 1980, now abandoned in the name of the same inventor and having the same title, which application is assigned to the same common assignee as the present application.

BACKGROUND OF THE INVENTION

1. Field of the Invention

Various types of manufacturing processes are known in which the starting materials are introduced into the furnace while cold or at ambient temperature by the use of either continuously or discontinuously operating devices. Such devices are frequently protected by a hydraulic or other cooling apparatus which absorbs the heat from the furnace and additionally intensifies the cooling of the materials introduced into the furnace. In these methods, and especially in melting glass, the starting materials are subjected to heating only after they have been introduced into the furnace where they receive, at high temperature, the quantities of heat necessary for heating them, for ensuring completion of the endothermic reactions, and for imparting thereto sufficient fluidity to ensure homogenization and refining of the resultant molten glass mass. It has been observed in glass making that the greater part of the heat delivered to the starting materials is directed to increasing the temperature of the starting materials rather than to producing the melting reactions. In most known methods, the starting materials are deposited on top of the molten bath and are subjected to radiation from the flames circulating with great turbulence above them. Since the newly-introduced materials are poor conductors of heat, the heat exchange is poor, which appreciably slows the melting process.

The present invention especially relates to increasing the efficiency and output of glass melting installations, and provides means whereby a glass melting furnace may be operated continuously and uniformly at full capacity or beyond, if desired. Apparatus is provided for preheating the throughly-mixed, glass-forming ingredients before the same are supplied to the melting furnace, and preferably utilizing the heat of the waste gases from the melting furnace in such preheating of the glass mixture, and causing continuous passage of the glass mixture by gravity through the preheater for subsequent delivery to the melting furnace.

This invention comprises an improved process and means for practicing the process to accomplish the aforesaid objects, and in the provision of an improved arrangement of apparatus for preheating the glass batch mixture and for utilizing waste gases from glass melting furnaces, or preheated hot air from such furnaces, as more fully set forth in the following specification, and as particularly pointed out in the appended claims.

The provision of the preheater for the glass-making mixture enables the utilization, for heating the same, of the heat in the waste gases from the melting furnace which otherwise would go to waste up the stack. While the use of hot waste gases is preferred to operate the preheater, preheated air from the furnace heat-recovery "checkers" area which is used for combustion, or a supplemental heat source such as an oil or gas burner, alone or in combination, may also be used to heat the air or waste gases for operating the preheater. Also, atmospheric air may be heated to operate the batch preheater. The provision of the preheater, continuously delivering glass batch mixture at a proper predetermined elevated temperature, to a melting furnace, which is used with either continuous or batch processes, permits more uniform operation of the furnace with a significant increase in efficiency of operation and in the output of the furnace.

2. Description of Prior Art

There is a considerable number of earlier-issued U.S. patents which deal with initially preheating the glass batch mixture prior to its delivery into the glass furnace. U.S. Pat. No. 3,607,170 to Malesak discloses method and apparatus in which the glass mixture is preheated in a non-oxidizing atmosphere while being advanced in a given direction through a preheating zone of a tunnel kiln. A mixture of glass powder and foaming agent is delivered into a hopper having a series of tubes through which the mixture passes.

U.S. Pat. No. 3,172,648 to Brichard relates to preheating of pulverous materials in which the quantity and rate of flow of the fumes in the preheating zone are in direct contact with the glass forming ingredients, such contact causing an entrainment of dust in the emitting fumes.

U.S. Pat. No. 4,045,197 to Tsai et al relates to apparatus and method for recovering the waste heat from the exhaust gases of a glass melting furnace and transferring such heat by heat pipes to an enclosure in which incoming batch materials are preheated prior to being fed to a furnace for melting. The heat pipes contain metallic sodium as the working fluid.

U.S. Pat. No. 3,788,832 to Nesbitt et al, and U.S. Pat. No. 3,880,639 to Bodner et al, owned by the same common assignee as the present application, both relate to the preheating of agglomerated glass batch materials by direct contact with a gaseous effluent being exhausted from a glass melting furnace.

U.S. Pat. No. 3,185,554 to Sweo et al relates to a method of preheating glass batch materials by independent heating means other than exhausted effluent so that there is no unpredictable relationship between varying amounts of waste heat and the amount of heat provided for preheating unmelted batch materials.

A considerable number of other patents relates to the direct heat exchange between incoming batch materials and exhaust gases from a glass melting furnace. These patents are: U.S. Pat. Nos. 3,607,190 to Penberthy, 4,026,691—Lovett, 3,526,492—Motsch, 3,350,213—Peyches, 1,543,770—Hilbert, 3,753,743—Kukuda, 1,610,377—Hitner, and 4,099,953—Rondeaux. Many techniques have been disclosed in the patent literature for direct and indirect heat exchange between hot exhaust gases from a glass melting furnace and incoming batch materials; however, none is capable of achieving the results attainable by the present invention.

DESCRIPTION OF THE PREFERRED EMBODIMENT

Figure 1:
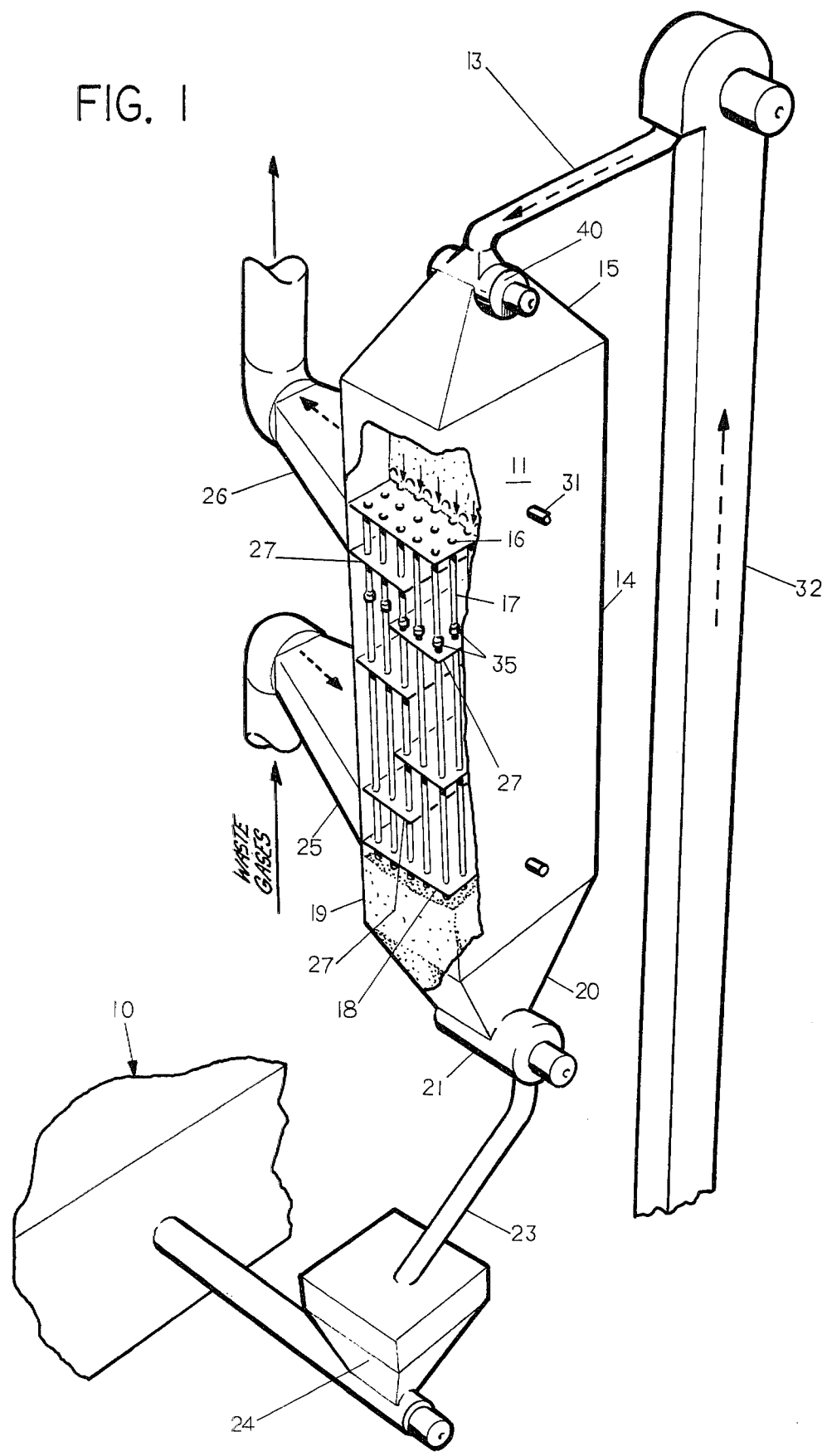
FIG. 1 is a perspective view partially broken away of the glass batch preheater apparatus for practicing the present invention.

Referring to the drawings, a glass melting furnace 10 of the regenerative type having a bottom of fire brick, whereon the melt of glass forming ingredients is deposited, is indicated schematically in FIG. 1. Gas and air are normally mixed and burned in the furnace above the glass forming materials, and the resulting heat melts the mixed materials to a mass of molten glass, which is delivered or worked from one end following refining. The regenerative or heat-accumulating chambers or passageways are normally located beneath the furnace melting chamber.

The air is usually passed through the regenerative passages beneath the furnace bottom for preheating and through side ports which lead into the furnace melting chamber where it is mixed with fuel which is burned to melt the glass forming materials. The hot waste gases are then passed through opposite side ports and then through the regenerative passages for heat recovery, and then to flue ducts and a discharge stack. After a limited period of operation in this manner, the path of travel of the incoming gas and air is switched, by suitable dampers and timers, so that the air then enters the melting chamber from opposite ports, the hot waste gases then passing off through opposite flue passages and ducts to the stack. By the alternate use of the regenerative passage for incoming combustion air and outgoing hot waste gases, the incoming air is preheated by the bricks of the regenerative passage which have been heated by the escaping flue gases which previously passed therethrough. All of the foregoing description pertains to well known glass furnace construction and is merely set forth by way of example. The waste gases from the furnace, the preheated combustion air from the furnace, or supplementary atmospheric air which has been suitably preheated, may alternatively be employed to operate the batch preheater.

In accordance with a preferred embodiment of the present invention, a preheater 11 is mounted adjacent to the batch feeding end of the glass furnace at an elevation higher than the normal elevation of the furnace batch chargers. The glass forming ingredients in suitably intermixed condition are delivered to the top of the preheater 11 by any suitable means such as a vertical elevator 32. The vertical elevator may consist of any endless chain or bucket-type arrangement of standard construction, capable of taking the glass forming mixture from a pile or hopper and delivering it into a chute 13 through which it passes into the top of the preheater 11. The glass forming mixture comprises the normal intermixed batch constituents and may or may not contain broken cullet for forming the glass melt. The cullet, when present, normally has a size ranging from less than one-half (½) inch U.S. mesh size, the smaller size being preferred for passage through the preheater to prevent bridging within or over the tubes. A rotary pocket valve 40 is mounted at the top of the preheater in chute 13 to seal off the system.

The preheater typically comprises a vertical chamber 14 having a rectangular cross-section with a frusto-pyramidal top cover 15. The main mass of glass batch is delivered through a chute leading into the bottom area of vertical elevator 32 for delivery to the top of preheater 11. Between the enclosed top cover and the main body portion of the preheater is located an interior horizontal upper plate 16 into which a plurality of open-ended tubes 17 are headed at their upper ends. The tubes are mounted in spaced-apart array in parallel, vertical alignment for passage of the glass batch therethrough. The space between the upper ends of adjacent tubes is covered with a bulbous nose member 30 to ensure free flow of the glass batch uniformly into each tube. Negative pressure is created in the area of the latter having one or more exit openings to allow the vaporized moisture contained in the batch to be removed. A single vacuum pipe 31 for the sub-atmospheric pressure can be used to interconnect with one or a plurality of the nose members. One nose member 30 is located between each array of upper ends of two adjacent rows of tubes. The negative pressure serves to force the moisture and water vapor contained in the glass batch upwardly against the flow of batch for its removal to avoid tube pluggage due to moisture condensation.

Figure 2:
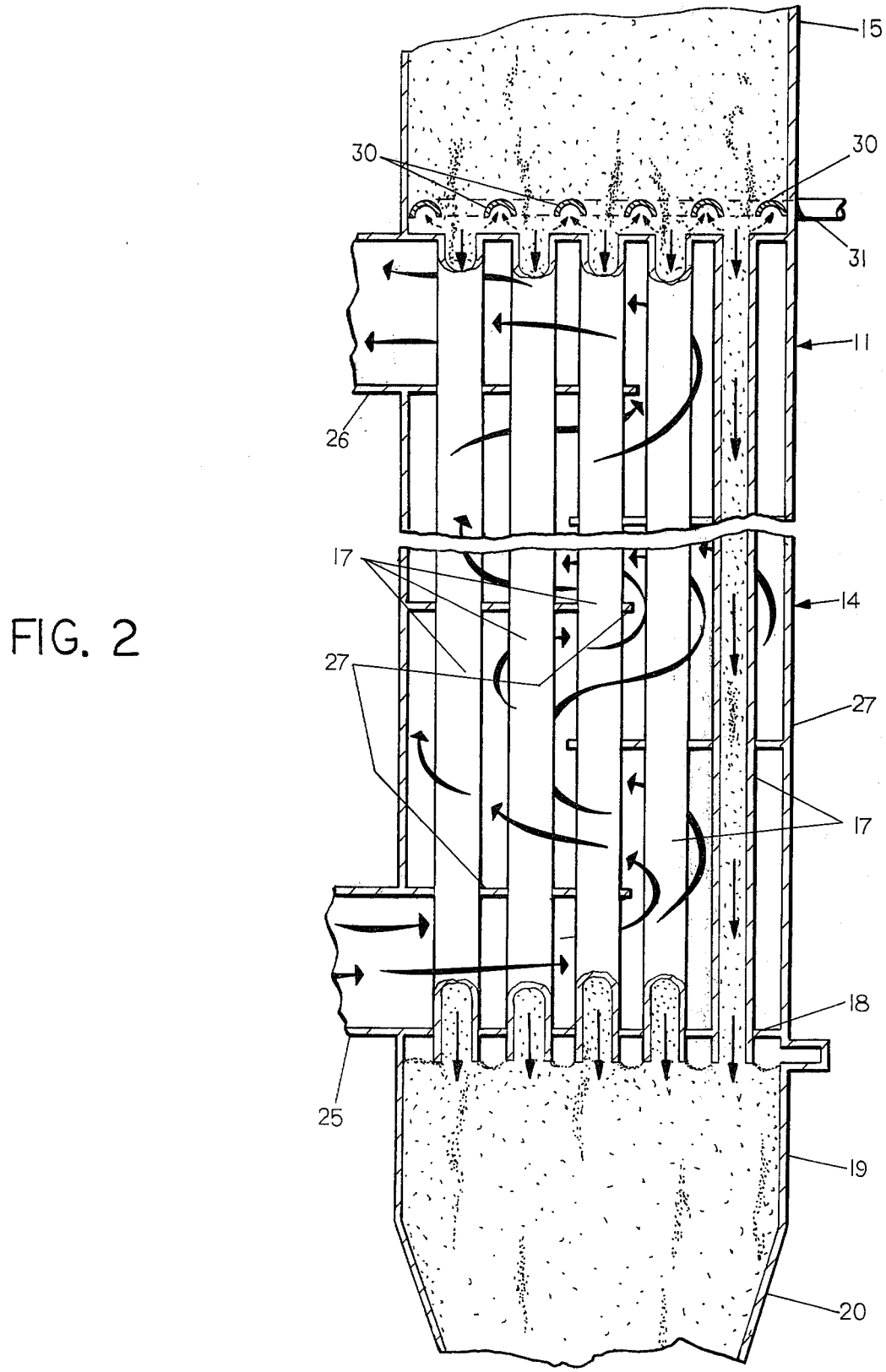
FIG. 2 is an enlarged fragmentary vertical sectional view of the preheater apparatus as shown in FIG. 1.

The arrows on FIG. 2 of the drawings at the top of the tubes 17 and in the vicinity of the nose members 30 show the flow of water vapor and moisture out of the batch into vacuum pipe 31 for its elimination. The downwardly-facing arrows within the tubes 17 and at the bottom of the preheater indicate the downward gravity flow of the glass batch.

The tubes 17 preferably of about a 4 inch outside diameter and extend throughout the central major portion of the preheater to an interior horizontal lower plate 18 into which they are similarly headed. Thus, the central portion of the preheater comprises a shell and tube arrangement. Tubes having about the stated dimension are capable of handing batch, including cullet, while tubes of about 2 inch internal diameter are able to handle cullet-free batch. The lower open ends of the tubes extend a short distance below lower plate 18 to allow free discharge of the glass batch therefrom. The space around the downwardly-projecting tube ends normally remains open above the collected batch emitting from the tubes. The number of tubes and dimensions of the preheater will depend upon the size of the glass melting furnace with which it is employed, and the desired conditions of use. The tubes are mounted on about 6 to 8 inch centers where 4 inch outside diameter tubes are employed, the corner tubes usually being omitted where the preheater has a rectangular or square horizontal cross-section. The tubes are preferably comprised of carbon or stainless steel for long-term use without rusting or corrosion, and are normally equi-spaced for optimum particulate batch flow.

The lower region of the preheater comprises a frusto-pyramidal bottom hopper 20 into which the open-ended tubes 17 deliver the heated glass batch. The bottom hopper terminates at its lower extremity into a screw-driven batch removal chamber 21 which interconnects with a valve member 22. The valve member has an exit portion for directing the heated glass batch through a chute 23 to a batch charger 24. The batch charger is capable of delivering the heated glass batch into the furnace 10 through a screw-driven feed member or other means as known in the art.

Immediately above the bottom interior header member 18 of the preheater, an incoming waste gas duct 25 is mounted for delivering hot waste gases into a lower region of the preheater. The duct is designed to open out into a relatively-flat, wide duct inlet having a width comparable to the preheater for introducing the hot gases across its full width.

Immediately below the upper interior header member 16 of the preheater, an outgoing waste gas duct 26 for removing hot waste gases from an upper region is mounted. The duct consists of a relatively-flat, wide duct outlet having a width comparable to the preheater for removing the hot gases across its full width.

A plurality of flat baffle plates 27 is mounted in spaced-apart, staggered relation within the preheater between the upper and lower interior header plates 16 and 18. The baffle plates 27 have openings therein through which the tubes 17 extend between their upper and lower extremities. The baffle plates are able to direct the upwardly coursing hot waste gases into a circuitous path to provide turbulence to the gases and thereby improve heat transfer to the tubes and the glass batch moving downwardly by gravity therewithin.

The batch mixture passes gradually and continuously through the preheater by gravity from top to bottom. The moisture normally found in the glass batch in an amount ranging 0.1 to 2 percent by weight is vaporized due to the batch heating. The sub-atmospheric pressure introduced into the enclosed area over the tube upper ends serves to remove the vaporized moisture upwardly counter to batch flow. Thus, its condensation or collection in the upper cooler areas of the tubes is prevented. The batch is then delivered, uniformly heated, moisture-free and well mixed, from the bottom hopper region of the preheater to the glass batch charger 24 of the furnace. The glass batch is thus advanced slowly and continuously downwardly through all of the preheater tubes to the furnace area for melting.

The glass batch in the preheater is indirectly heated by the hot waste gases which are taken from the furnace prior to their arrival at the stack. As shown, the hot gases enter the bottom region of the preheater near the lower end of the tubes and immediately above lower plate 18, the gases then passing in a serpentine path around the baffle plates 27 to the top of the preheater at the underside of upper plate 16, and then escaping from the preheater through outgoing duct 26. Inlet and outlet ducts 25 and 26 may be provided with dampers so that the flow of hot gases through the preheater may be accurately controlled. The gases passing in countercurrent flow to the descending glass forming materials, within the tubes, move between and around the tubes heating the same, and the contained glass batch indirectly. Further, the hottest gases thus act upon the hottest portion of the glass forming constituents in the lower area of the preheater, adding a further increment to their heat before passing into the melting furnace. As stated hereabove, the hot gas stream may be comprised of waste gases from the furnace heating zone, or preheated combustion air from the furnace checkers area, or preheated outside air which has been supplementally heated prior to delivery to the batch preheater.

By proper design of the upper and lower hopper sections of the preheater, such areas having generally frusto-pyramidal shapes, relatively-uniform and smooth flow of the batch materials by gravity through the entire vertical height of the preheater is attained. Thus, flow rates of the batch through all of the heat exchanger tubes, to maintain the same virtually-full at all times, is obtained for uniform amounts of preheating. The preferred form of construction of the preheater is having a straight section with rounded corners at an upper region above the tubes, and a wedge-shaped hopper with rounded corners at the bottom at the tube lower ends for continuous movement of the hot, dry batch. A sufficient head is thereby maintained over the tubes to assure such gravity flow, along with a suitable feeder unit to remove preheated material from the bottom of the hopper.

The negative pressure, or vacuum, is introduced into an upper region of the preheater through the inlet pipe 31 leading from a source of vacuum such as a vacuum pump. The decreased pressure in the upper region serves to cause the contained moisture in the glass batch to move upwardly during downward gravity flow of the batch to prevent its collection and condensation within the batch in an upper region of the tubes. Such condensation can can cause a wetting of the batch and pluggage of the tubes, thereby causing either a shutdown or very inefficient operation of the preheater. The sub-atmospheric pressure serves to drive the moisture within the batch upwardly in the tubes to the upper region of the preheater from which area it can be expelled. At least one vent pipe or tube 31 is mounted within the upper sidewall of the preheater for removing the moisture and water vapor.

The negative pressure in the upper region of the preheater is preferably maintained within a range of from about 10 mm to 25 mm of mercury at ambient temperature, a pressure of about 23 mm of Hg at about 65° F. being preferred. Such pressure is adequate to prevent water and moisture condensation in the batch in the preheater tubes.

Through proper and thorough mixing of the newly-incoming cold batch fraction, uniform and continuous operation of the preheater apparatus can be practiced. This can be accomplished when the temperature conditions, and the flow of gases and batch material, are properly adjusted. Such uniform operation permits the maintenance of substantially-constant conditions within the preheater for delivering significantly-hotter glass batch to the furnace, greatly increasing the furnace efficiency.

The temperature of the stack gases entering the preheater will vary with furnace conditions, of course; however, they will normally be from 900° F. to 1110° F. and will frequently average about 100° F. for substantial periods. The gases leaving the preheater will range from about 400° F. to 600° F., averaging about 500° F.

Obviously, additional heating means for the preheater may be provided, if desired, although the furnace waste gases are usually fully adequate for most economical operation. The waste gases, or hot air, normally enter the preheater at a temperature ranging from about 900° F. to 1100° F., after leaving the furnace combustion or checkers area. As stated, preheated combustion air which has passed through the furnace heat-recovery area can also be used to heat the batch in the preheater, or a separate supplemental heat source, such as a burner, may be used.

The glass batch mixture usually enters the top of the preheater at about ambient temperature and leaves the preheater at the valve member 22 having a temperature ranging from about 800° F. to 1000° F. Such temperatures are possible with a glass furnace which is capable of manufacturing about 100 to 300 tons per day of product.

The present invention is capable of capable of continuous operation when downward movement of the glass batch in the cooler upper region of the preheater is supplemented with negative pressure which is sub-atmospheric. When the pressure on the batch in such region is allowed to fall to atmospheric, the residual moisture within the batch is able to condense within the tubes, and within the top cover member 15 of the preheater, causing pluggage of some of the tubes and bridging of the normally-flowable mass. Such pluggage prevents optimum operation of the preheater and cannot be tolerated in long-term operation. By keeping all interior surfaces of the upper region of the preheater contacted by the cooler batch below atmospheric pressure, the water contained in the batch in vaporous form is driven upwardly and batch adherance to such contacted surfaces can be prevented and smooth flow maintained.

The present invention is not limited to the interaction of one preheater to one melting furnace, the former being connected with hot gases leading to one stack. If desired, one preheater may be connected to serve a number of melting furnaces, or a number of preheaters may be associated with one furnace, and the waste gases emitting therefrom.

The present invention can also be employed to heat individual glass batch constituents such as sand, limestone, soda ash, etc. to remove moisture therefrom prior to their introduction into a melting furnace, for example. Further, glass cullet, or mixtures of glass batch and cullet, in widely ranging ratios can also be heated in the apparatus and by the method of this invention, so long as the particulate material has one or more volatile components therein which tends to condense within the heating apparatus. Such batch constituents may be individually or combinedly heated to temperatures ranging from about 600° F. to 800° F. The glass cullet when heated alone may be heated to even higher temperatures. The mixed batch and cullet can be heated up to a weight percentage of about 70% cullet or higher, the reduced internal pressure preventing pluggage of the tubes in cooler areas of the tubes due to moisture condensation. Virtually all areas of the tubes, and especially their upper areas, are maintained at a temperature above the boiling point temperature of water, i.e., 212° F. The particulate material to be heated can contain a volatile constituent such as water or a decomposable constituent which produces water on decomposition. Such constituents can be readily eliminated from an upper region of the preheater by the vacuum line without interrupting the continuous gravity flow of the particulate material.

Various modifications may be resorted to within the spirit and scope of the appended claims.

I claim:

1. The process of preheating pulverous glass batch prior to its delivery to a glass melting furnace comprising the steps of introducing the fully-intermixed, glass batch constituents into the upper region of a tubular heat exchanger, allowing the glass batch to flow downwardly by gravity through a plurality of open-ended tubes of said heat exchanger, passing hot gases upwardly through said heat exchanger around the exterior of said open-ended tubes to heat the glass batch contained therein by countercurrent indirect heat transfer, maintaining a sub-atmospheric pressure over the glass batch contained in said open-ended tubes to remove the contained moisture, and delivering the said heated glass batch from the bottom of said heat exchanger into the glass melting furnace.

2. The process in accordance with claim 1, wherein hot gases from said glass melting furnace are directed upwardly in a circuitous path around said open-ended tubes by a series of spaced-apart baffles to achieve greater indirect heat transfer.

3. The process in accordance with claim 1, wherein a vacuum line is employed to maintain sub-atmospheric pressure over the glass batch contained in said open-ended tubes.

4. The process in accordance with claim 1, wherein a vacuum line at a negative pressure ranging from about 10 mm to 25 mm of mercury is employed to maintain sub-atmospheric pressure over the glass batch contained in said open-ended tubes.

5. The process in accordance with claim 1, wherein a vacuum line adapted to remove the contained moisture from said glass batch is connected to an upper region of said heat exchanger above said open-ended tubes.

6. The process of preheating pulverous glass batch prior to its delivery to a glass melting furnace comprising the steps of introducing the fully-intermixed, glass batch constituents into the upper region of a tubular heat exchanger, allowing the glass batch to flow continuously downwardly by gravity through a plurality of vertical parallel open-ended tubes of said heat exchanger, passing hot gases upwardly through said heat exchanger around the exterior of said open-ended tubes to heat the glass batch contained therein by countercurrent indirect heat transfer, maintaining decreased pressure less than atmospheric over the glass batch contained in said open-ended tubes to remove the contained moisture in vaporized form, and delivering the said preheated glass batch from the bottom of said heat exchanger into the glass melting furnace.

7. The process in accordance with claim 6, wherein a sub-atmospheric pressure of about 23 mm of mercury at a temperature of about 65° F. is maintained over the said glass batch for the water released during heating to remain in vapor form.

8. The process in accordance with claim 6, wherein at least one vacuum line is connected to an upper region above the said open-ended tubes of said preheater.

9. Combined apparatus for preheating glass furnace batch comprising an elongated vertically-mounted heat exchanger having a plurality of open-ended tubes extending throughout a major central portion of its height, means for delivering glass batch in fully-intermixed condition to an upper region of said heat exchanger for its passage by gravity through said open-ended tubes, means for introducing hot gases from said glass furnace into a lower region of said heat exchanger to circulate upwardly between the said open-ended tubes, baffle means mounted around said tubes to direct said hot gases in a circuitous path around said tubes and out of contact with said glass batch for indirect heat transfer, and means for creating sub-atmospheric pressure within the upper region of said heat exchanger to remove the contained moisture in vapor form, and means for delivering the said glass batch to said glass furnace in essentially moisture-free preheated condition.

10. Combined apparatus in accordance with claim 9, wherein said means for introducing said hot gases into a lower region of said heat exchanger comprises a hollow duct leading from the furnace combustion chamber to said heat exchanger.

11. Combined apparatus in accordance with claim 9, wherein said baffle means comprises a series of baffle plates extending in staggered spaced-apart horizontal relation as a vertical array within said heat exchanger mounted around said open-ended tubes.

12. Combined apparatus in accordance with claim 9, wherein said open-ended tubes have generally uniform length and a uniform internal diameter of not less than about 2 inches.

13. Combined apparatus in accordance with claim 9, wherein said elongated preheater has a rectangular cross-section and the open-ended tubes are disposed in equi-spaced vertical array in a shell-and-tube arrangement for transporting said glass batch constituents continuously downwardly by gravity.

14. Combined apparatus in accordance with claim 9, wherein said means for creating sub-atmospheric pressure within an upper region of said preheater comprises a vacuum line connected to a vacuum-creating means.

15. A process for heating a particulate material such as glass batch, individual glass batch constituents, glass cullet, mixtures thereof, and the like, which contain a volatile condensible constituent, comprising the steps of introducing the particulate material into the upper region of an enclosed tubular heat exchanger, allowing the particulate material to flow downwardly by gravity through a plurality of open-ended tubes of said heat exchanger, passing hot gases upwardly through said heat exchanger around the exterior of said open-ended tubes to heat the particulate material contained therein by countercurrent indirect heat transfer, maintaining a sub-atmospheric pressure over the particulate material contained in said open-ended tubes to remove the contained volatile condensible constituent, and delivering the said particulate material from the bottom of said heat exchanger in heated condition essentially free of said volatile condensible constituent.

16. The process in accordance with claim 15, wherein a vacuum line is employed to maintain sub-atmospheric pressure over the particulate material contained in said open-ended tubes.

17. The process in accordance with claim 15, wherein the hot gases are directed upwardly in a circuitous path around said open-ended tubes by a series of spaced-apart baffles to achieve greater indirect heat transfer.

18. The process in accordance with claim 15, wherein a vacuum line at a negative pressure ranging from about 10 mm to 25 mm of mercury is employed to maintain sub-atmospheric pressure over the particulate material contained in said open-ended tubes.

19. The process in accordance with claim 15, including the step of connecting at least one vacuum line to an upper region of said heat exchanger above said open-ended tubes to remove the volatile constituent from said particulate material.

20. The process in accordance with claim 15, including the step of maintaining a continuous sub-atmospheric pressure of about 23 mm of mercury at a temperature of about 65° F. over the said particulate material for the volatile constituent released during heating to remain in vapor form.

21. A heat exchanger for heating a particulate material such as glass batch, individual glass batch constituents, glass cullet, mixtures thereof, and the like, which contain a volatile condensible constituent, comprising an elongated vertically-mounted hollow enclosed chamber having a plurality of open-ended hollow tubes extending throughout a major portion of its height, means for delivering the particulate material to an upper region of said heat exchanger for its passage by gravity through said open-ended hollow tubes, means for introducing hot gases into a lower region of said heat exchanger to circulate upwardly between the said open-ended tubes, baffle means mounted around said tubes to direct said hot gases in a circuitous path around said tubes and out of contact with said particulate material for indirect heat transfer, means for creating sub-atmospheric pressure within an upper region of said heat exchanger to remove the volatile condensible constituent in vapor form from said particulate material, and means for delivering said particulate material at a lower region of said heat exchanger in heated condition essentially free of said volatile condensible constituent.

22. A heat exchanger in accordance with claim 21, wherein said means for introducing hot gases into a lower region of said heat exchanger comprises a hollow duct leading from a melting furnace to said heat exchanger.

23. A heat exchanger in accordance with claim 21, wherein said means for creating sub-atmospheric pressure within an upper region of said heat exchanger comprises a vacuum line connected to a vacuum-creating means.

24. A heat exchanger in accordance with claim 21, wherein said baffle means comprises a series of baffle plates extending in staggered spaced-apart horizontal relation as a vertical array within said heat exchanger mounted around said open-ended tubes.

25. A heat exchanger in accordance with claim 21, wherein said open-ended hollow tubes have generally uniform length and a uniform internal diameter of not less than about two inches.

26. A heat exchanger in accordance with claim 21, wherein said elongated hollow enclosed chamber has a rectangular cross-section and the open-ended tubes are disposed in equispaced vertical array in a shell-and-tube arrangement for transporting said particulate material continuously downwardly by gravity.

* * * * *